United States Patent [19]
Kubota

[11] Patent Number: 5,054,884
[45] Date of Patent: Oct. 8, 1991

[54] BEAM SPLITTER INCLUDING A DIFFRACTION GRATING AND ONE OF STEP SHAPED, INCLINED, OR CURVED TRANSPARENT SURFACE

[75] Inventor: Toshihiro Kubota, Hirakata, Japan

[73] Assignee: Dainippon Screen Mfg Co. Ltd., Japan

[21] Appl. No.: 488,863

[22] Filed: Mar. 5, 1990

[30] Foreign Application Priority Data

Mar. 6, 1989 [JP] Japan ................................. 1-53531
Feb. 22, 1990 [JP] Japan ................................. 2-42145

[51] Int. Cl.$^5$ ............................ G02B 5/18; G02B 5/32; G02B 27/10
[52] U.S. Cl. .................................. 359/566; 359/573; 359/629; 359/15
[58] Field of Search .................. 350/162.17, 162.20, 350/162.21, 162.22, 162.23, 162.24, 171, 96.19, 3.7

[56] References Cited

U.S. PATENT DOCUMENTS

| | | | |
|---|---|---|---|
| 3,674,335 | 7/1972 | Ashkin et al. | 350/162.2 |
| 3,982,810 | 9/1976 | Tamir et al. | 350/162.22 |
| 4,362,361 | 12/1982 | Campbell et al. | 350/171 |
| 4,397,525 | 8/1983 | Ahlen | 350/162.17 |
| 4,620,791 | 11/1986 | Combastet | . |
| 4,671,603 | 6/1987 | McQuoid | 350/3.7 |
| 4,711,512 | 12/1987 | Upatnieks | 350/174 |
| 4,914,553 | 4/1990 | Hamada et al. | 350/345 |

FOREIGN PATENT DOCUMENTS

| | | |
|---|---|---|
| EP0030671A | 1/1980 | European Pat. Off. . |
| 65690 | 6/1978 | Japan ................................. 350/345 |
| 123823 | 7/1985 | Japan ................................. 350/345 |
| WO81/03551 | 12/1981 | PCT Int'l Appl. . |
| WO81/03552 | 12/1981 | PCT Int'l Appl. . |

Primary Examiner—Jon W. Henry
Attorney, Agent, or Firm—Ostrolenk, Faber, Gerb & Soffen

[57] ABSTRACT

A beam splitter which includes a transparent layer, a diffraction grating layer and an introduction member for introducing incident light. The incident light is repeatedly totally reflected to the transparent layer. When the incident light is reflected, the incident light is also diffracted by the diffraction grating.

3 Claims, 14 Drawing Sheets

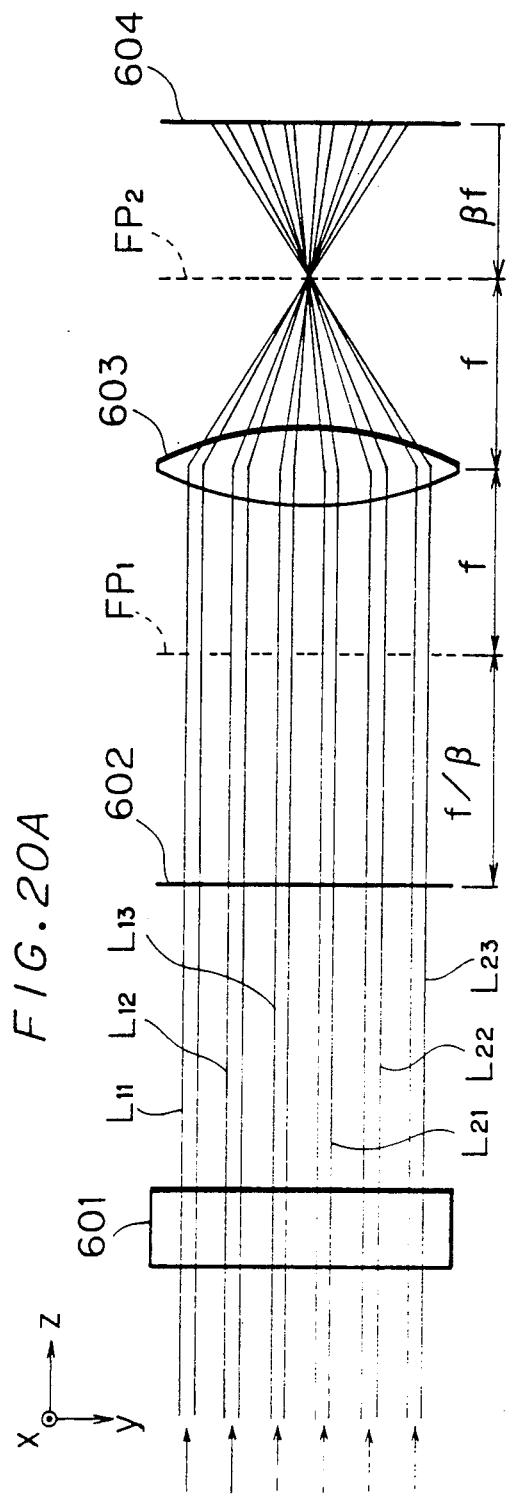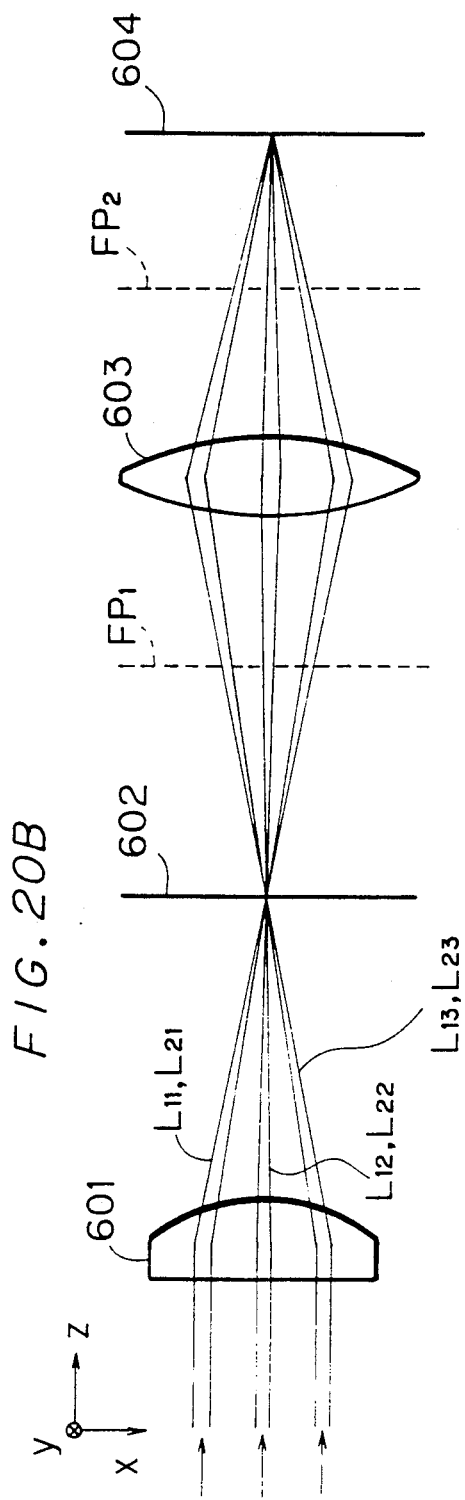

BEAM SPLITTER INCLUDING A DIFFRACTION GRATING AND ONE OF STEP SHAPED, INCLINED, OR CURVED TRANSPARENT SURFACE

BACKGROUND OF THE INVENTION

1. Field of the Invention

The present invention is related to a beam splitter for producing a plurality of light beams from a single beam.

2. Description of the Prior Art

A prior art beam splitter for producing a plurality of light beams is described in U.S. Pat. No. 4,125,865 and in Japanese Patent Laid Open Gazette No. 60-19101. FIG. 1 is a sectional view of a known beam splitter $BS_o$. The beam splitter $BS_o$ comprises a transparent substrate 11, a total reflection film 12 and an anti-reflection film 17 which are formed on one surface of the substrate 11, and a plurality of semitransparent films 13-16 formed on the other surface of the substrate 11. The semi-transparent films 13-16 have different characteristics. A light beam $L_1$ is introduced into the transparent substrate 11 through the anti-reflection film 17, and parts of the light beam $L_1$ are emitted through the semi-transparent films 13-16 as outgoing beams $L_{01}$, $L_{02}$, .... Thus, the beam splitter $BS_o$ produces a plurality of light beams $L_{01}$, $L_{02}$, .. from a single light beam $L_1$.

Desirably, the outgoing beams $L_{01}$, $L_{02}$, ... should have equal intensities. In order to attain this, the transmission factors of the semi-transparent films 13-16 progressively increase. For example, as described in Japanese Patent Laid Open Gazette No. 60-19101, the semi-transparent films 13-16 are formed as multi-layers, with the number of layers progressively decreasing. Such films can be formed through deposition of $TiO_2$ or $SiO_2$. However, the thickness of each layer should be precisely controlled to attain desired transmission factors; such fabrication is time-consuming and costly.

SUMMARY OF THE INVENTION

The present invention is directed to a beam splitter, comprising: a transparent layer, an introduction member for introducing a light beam into the transparent layer, the light beam being totally reflected in the transparent layer, and a diffraction grating formed on at least a part of a surface of the transparent layer, at which part the light beam is totally reflected, the diffraction grating diffracting the light beam to produce a plurality of diffracted beams going out of the transparent layer. The transparent layer may have a first flat surface on which the diffraction grating is formed and a second flat surface which is parallel to the first flat surface.

According to an aspect of the present invention, the introduction member is a triangle pole prism attached to the transparent layer.

According to another aspect of the present invention, the beam splitter comprises another diffraction grating formed on at least a part of the second flat surface, at which part the light beam is totally reflected.

According to another aspect of the present invention, the beam splitter comprises a reflecting layer formed on at least a part of the second flat surface where the plurality of diffracted beams are to pass through.

According to another aspect of the present invention, the light beam is reflected and diffracted at plural positions of the first flat surface, and a grating constant of the diffraction grating differs at the plural positions of the first flat surface. The grating constant may be arranged such that the diffracted beams are equally intense.

According to another aspect of the present invention, the beam splitter comprises an element for controlling propagation of the diffracted beam, the element is fixed on at least a part of the second flat surface where the plurality of diffracted beams are to pass through. The element may be a liquid crystal element.

According to another aspect of the present invention, the diffracted grating is integrated with the transparent layer.

According to another aspect of the present invention, the introduction member is integrated with the transparent layer, and the light beam is perpendicularly incident on a third flat surface of the transparent layer which is inclined with respect to the first and second flat surfaces.

According to another aspect of the present invention, the transparent layer has a flat surface on which the diffraction grating is formed, and a stepwise surface each step of which is parallel to the flat surface.

According to another aspect of the present invention, the transparent layer has a flat surface on which the diffraction grating is formed, and a second flat surface which is inclined with respect to the first flat surface.

According to another aspect of the present invention, the transparent layer has a flat surface on which the diffraction grating is formed and a curved surface which is opposite to the flat surface, the curvature of the curved surface being such that diffracted beams are converged.

The present invention is also directed to a beam splitting system, comprising: a first beam splitter comprising: a first transparent layer, a first introduction member for introducing a light beam into the first transparent layer, the light beam being totally reflected in the first transparent layer, and a first diffraction grating formed on at least a part of a surface of the first transparent layer, at which part the light beam is totally reflected, the first diffraction grating diffracting the light beam to produce first parallel diffracted beams, which are lined up and which go out of the first transparent layer; and a second beam splitter, comprising: a second transparent layer, a second introduction member for introducing the first diffracted beams into the second transparent layer, the first diffracted beams being totally reflected in the second transparent layer, and a second diffraction grating formed on at least a part of a surface of the second transparent layer, at which part the first diffracted beams are totally reflected, the second diffraction grating diffracting the first diffracted beams to produce second parallel diffracted beams which are arrayed in a manner of lattice points of a two-dimensional lattice and which go out of the second transparent layer.

Incidentally, the first flat surface of the transparent layer may be formed into the diffraction grating. An end portion of the transparent layer may be formed into the introduction member, and the light beam may be incident on a third flat surface of the end portion which is inclined with respect to the first and second flat surfaces.

Accordingly, an object of the present invention is to provide a beam splitter which can be easily fabricated.

These and other objects, features, aspects and advantages of the present invention will become apparent from the following detailed description of the present invention when taken in conjunction with the accompanying drawings.

BRIEF DESCRIPTION OF THE DRAWINGS

FIGS. 20A and 20B are a plan view and a front view, respectively, of an optical system utilizing multibeams produced by the beam splitting system;

DETAILED DESCRIPTION OF THE PREFERRED EMBODIMENTS

Figure 1:
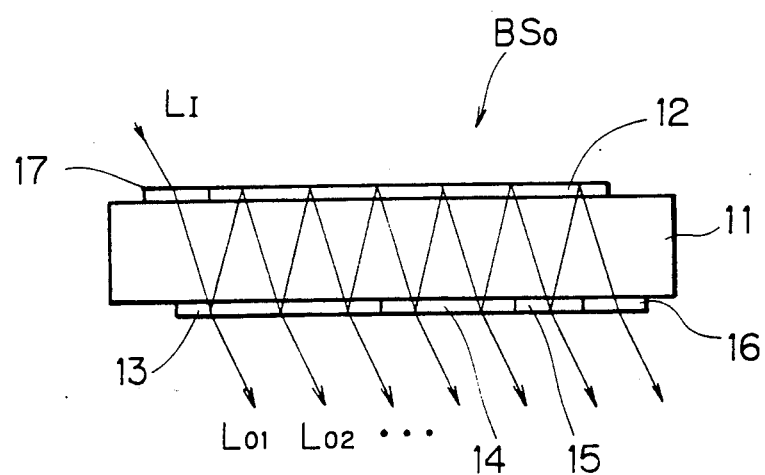
FIG. 1 is a sectional view of a prior art beam splitter.
Figure 2:
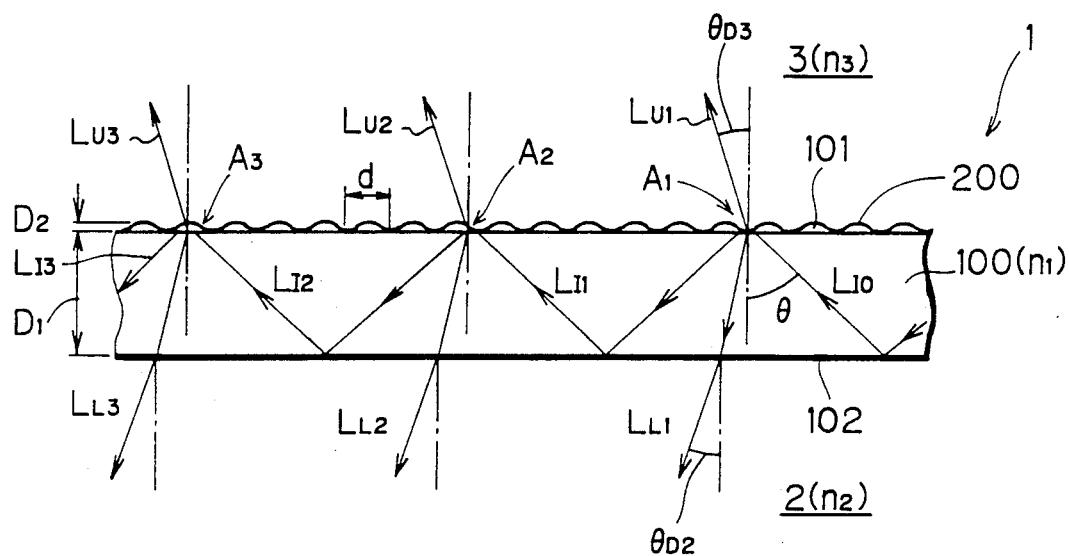
FIGS. 2, 3, 5, 6, 9, 10, 10A, 11, 13 through 15, 17 and 19 are sectional views of beam splitters according to the present invention.

The beam splitter 1 illustrated in FIG. 2 comprises a transparent substrate 100 having parallel surfaces 101 and 102, and a diffraction grating 200 formed on the upper surface 101. The thickness $D_2$ of the diffraction grating 200 (a few hundred nanometers, for example) is very small compared to the thickness $D_1$ of the substrate 100 (1 mm, for example). The size of the diffraction grating 200 is exaggerated for convenience of illustration.

An incident beam $L_{I0}$ is totally reflected within the substrate 100 under the following conditions (which are the same as in a transparent slab without a diffraction grating):

$$\theta > \sin^{-1}(n_2/n_1) \tag{1a}$$

and $$\theta > \sin^{-1}(n_3/n_1) \tag{1b}$$

and where $\theta$ denotes a reflection angle and $n_1$, $n_2$ and $n_3$ denote refractive indexes of the substrate 100, a medium 2 under the substrate 100, and a medium 3 under the substrate 100, respectively.

If the above conditions are met, the incident beam $L_{I0}$ is totally reflected between the upper surface 101 and the lower surface 102, and is transmitted through the substrate 100 as internal reflected beams $L_{I1}$, $L_{I2}$, $L_{I3}$, .... At each position of the boundary between the diffraction grating 200 and the substrate 100 where the internal beam is reflected, the internal beam is diffracted by the diffraction grating 200, whereby diffracted beams are emitted out of the substrate 100. For example, primary diffracted beams $L_{L1}$ and $L_{U2}$ are produced at the first total-reflection $A_1$, and emitted to the media 2 and 3, respectively. A diffraction angle $\theta_{D3}$ of the upper diffracted beam $L_{U1}$ is found by the following equations:

$$\beta - \beta_D = 2\pi/d \tag{2}$$

$$\beta = (2\pi/\lambda_C)n_1 \sin\theta \tag{3}$$

$$\beta_D = (2\pi/\lambda_C)n_3 \sin\theta_{D3} \tag{4}$$

where d denotes a grating constant of the diffraction grating 200 and $\lambda_C$ denotes the wavelength of the incident beam $L_{I0}$ in air.

The lower diffracted beam $L_{L1}$ passes through the substrate 100 and goes out into the medium 2 after being refracted at the lower surface 102. A refraction angle $\theta_{D2}$ of the lower diffracted beam $L_{L1}$ satisfies the following equation:

$$n_2 \sin\theta_{D2} = n_3 \sin\theta_{D3} \tag{5}$$

Incidentally, the word "total reflection" in this specification means a phenomenon which satisfies conditions (1a) and (1b), including one that is accompanied with diffracted beams produced by a diffraction grating.

As described above, the transparent substance 100 having the diffraction grating 200 on its surface 101 functions as a beam splitter which diffracts the incident light $L_{I0}$ to produce two diffracted beams $L_{L1}$ and $L_{U2}$ as outgoing light.

The rest of the incident light $L_{I0}$ (other than the diffracted beams) is totally reflected at the total reflection position $A_1$ to become the internal reflected beam $L_{I1}$. If the intensity of high-order diffracted light is negligible, intensity values $I_{I0}$ and $I_{I1}$ of the beams $L_{I0}$ and $L_{I1}$, respectively, satisfy the following equation:

$$I_{I0} = I_{I1} + I_{L1} + I_{U1} \tag{6}$$

Equation (6) can be rewritten in terms of diffraction efficiency $\eta_1$ as follows:

$$I_{I1} = I_{I0}(1 - \eta_1) \tag{7}$$

$$\eta_1 = \eta_{U1} + \eta_{L1} \tag{8a}$$

$$\eta_{U1} = I_{U1}/I_{I0} \tag{8b}$$

$$\eta_{L1} = I_{L1}/I_{I0} \tag{8c}$$

The diffraction efficiency values $\eta_{U1}$ and $\eta_{L1}$ mainly depend on the depth of the grooves of the diffraction grating 200.

Equation (6) shows that the intensity of the internal reflected beam decreases by the intensity values of the diffracted beams. Therefore, the intensity values of internal reflected beams $L_{I1}$, $L_{I2}$, $L_{I3}$, which are reflected at total reflection positions $A_1$, $A_2$, $A_3$, respectively, decrease geometrically:

$$I_{I2} = I_{I1}(1 - \eta_1) = I_{I0}(1 - \eta_1)^2 \tag{9}$$

$$I_{I3} = I_{I2}(1 - \eta_1) = I_{I0}(1 - \eta_1)^3 \tag{10}$$

Intensity values of upper diffracted beams $L_{U1}$, $L_{U2}$, $L_{U3}$, which are diffracted at the total reflection positions $A_1$, $A_2$, $A_3$, respectively, and those of lower diffracted beams $L_{L1}$, $L_{L2}$ and $L_{L3}$, also decrease in the same manner as follows:

$$I_{L1} = I_{I0} \cdot \eta_{L1} \tag{11}$$

$$I_{L2} = I_{I1} \cdot \eta_{L1} = I_{I0}(1-\eta_1) \cdot \eta_{L1} \quad (12)$$

$$I_{L3} = I_{I2} \cdot \eta_{L1} = I_{I0}(1-\eta_1)^2 \cdot \eta_{L1} \quad (13)$$

$$I_{U1} = I_{I0} \cdot \eta_{U1} \quad (14)$$

$$I_{U2} = I_{I0}(1-\eta_1) \cdot \eta_{U1} \quad (15)$$

$$I_{U3} = I_{I0}(1-\eta_1)^2 \cdot \eta_{U1} \quad (16)$$

The upper diffracted beams $L_{U1}$, $L_{U2}$, $L_{U3}$ go out from the substrate 100 at the same angle $\theta_{D3}$ with respect to the normal to the upper surface 101. The lower diffracted beams $L_{L1}$, $L_{L2}$, $L_{L3}$ also go out at the same angle $\theta_{D2}$ with respect to the normal to the lower surface 102.

Thus, the beam splitter 1 produces parallel beams $L_{U1}$, $L_{U2}$, $L_{U3}$ going into the upper medium 3, intensity values of which decrease in geometric progression, while also producing similar parallel beams $L_{L1}$, $L_{L2}$, $L_{L3}$ going into the lower medium 2. Since the incident light $L_{I0}$ and internal reflected beams $L_{I1}$, $L_{I2}$, ... are totally reflected inside of the substrate 100, the beam splitter 1 sustains no loss in terms of quantity of light beams other than that due to diffraction. Therefore, the beam splitter 1 has a high efficiency in terms of utilizing the incident $L_{I0}$.

Figure 3:
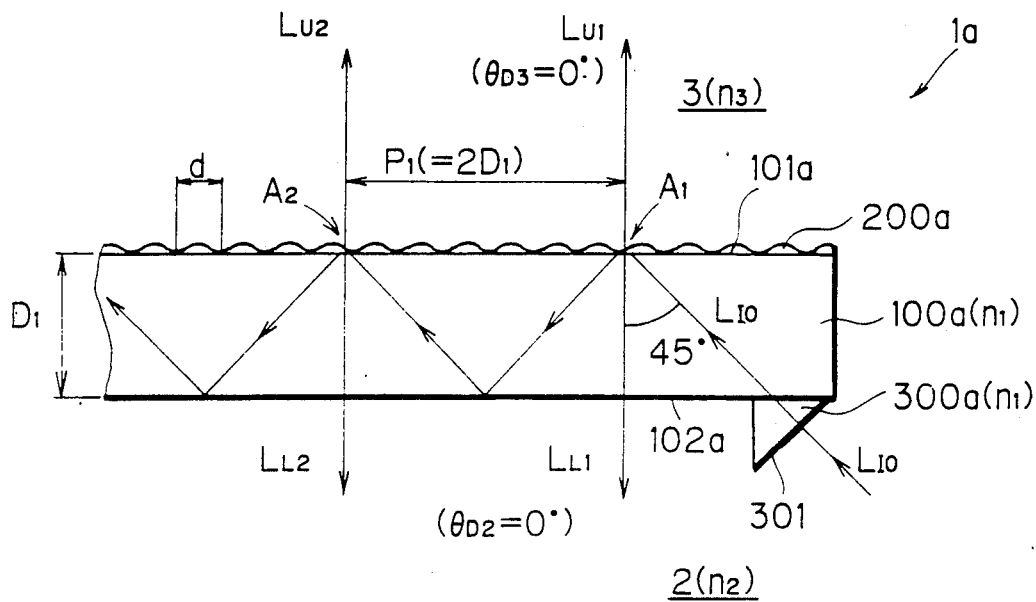

The beam splitter 1a illustrated in FIG. 3 comprises a triangle pole prism 301 for introducing incident light into a substrate. The beam splitter 1a comprises a transparent substrate 100a made of glass having parallel surfaces 101a and 102a, and a diffraction grating 200a formed on the upper surface 101a. The prism 300a is fixed on a part of the lower surface 102a with an index matching liquid or a transparent adhesive agent therebetween. The lower and upper media 2 and 3 are air.

The beam splitter 1a is formed such that the angles $D_3$ and $D_2$ of the diffracted beams $L_{U1}$ and $L_{L1}$, respectively, are zero, as described below. The angles $D_3$ and $D_2$ and the grating constant d satisfy equations (2)-(4). Therefore the grating constant d is as follows:

$$d = \lambda_C / (n_1 \sin\theta - n_3 \sin\theta_{D3}) \quad (17)$$

To find the grating constant d which makes the angles $D_3$ and $D_2$ zero, the following values are assumed:

$$n_1 = 1.5 \text{ (for glass)} \quad (18a)$$

$$n_2 = n_3 = 1.0 \text{ (for air)} \quad (18b)$$

$$\theta = 45° \quad (18c)$$

$$\theta_{D3} = 0° \quad (18d)$$

$$\lambda_C = 632.8 \text{ nm (for He-Ne laser)} \quad (18e)$$

By substituting the values of expressions (18a)-(18e) into equation (17), the grating constant d is found to be 0.597 μm.

Figure 4:
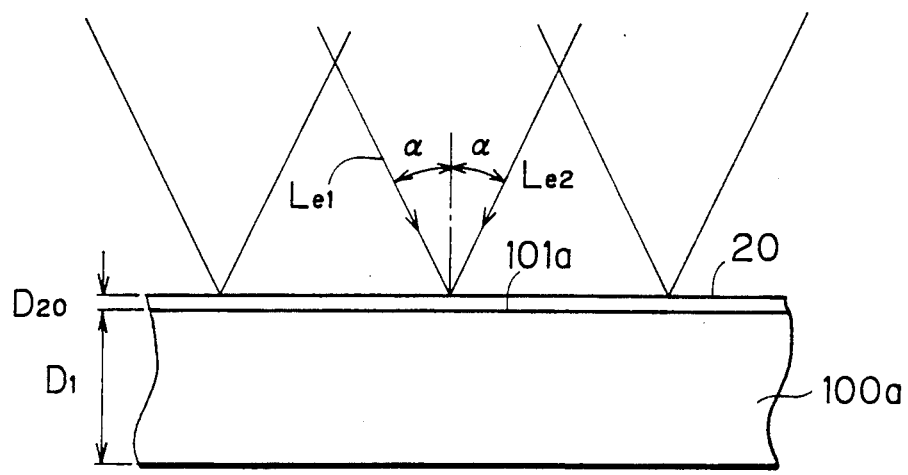
FIGS. 4 and 12 are schematic views showing methods of forming a diffraction grating.

FIG. 4 is a schematic view showing a method of fabricating the diffraction grating 200a. First, photoresist 20 of a uniform thickness $D_{20}$ (about a few hundred nanometers) is coated on the upper surface 101a of the substrate 100a. Second, two collimated homogeneous laser beams $L_{e1}$ and $L_{e2}$, which are divided from a single laser beam, are incident on the photoresist 20 at the same incident angle but from opposite sides, thereby exposing the photoresist 20. The two homogeneous beams $L_{e1}$ and $L_{e2}$ interfere with each other to produce interference fringes in the form of minute lines on the photoresist 20. Finally, the photoresist 20 is developed to become the diffraction grating 200a with equally spaced apart grooves. The grating constant d of the diffraction grating 200a is expressed in terms of the wavelength $\lambda_0$ of the homogeneous beams $L_{e1}$ and $L_{e2}$ and their incident angle $\alpha$ as follows:

$$d = \lambda_0/(2 \sin \alpha) \quad (19)$$

Assuming that the wavelength $\lambda_0$ is 457.9 nm, the incident angle $\alpha$ is set at 22.6 degrees so that the grating constant d of the grating 200a is equal to 0.597 μm. The foregoing method facilitates duplication of the diffraction grating and therefore its mass production and thus reduces fabrication cost. Details of the method are described in Fujio Iwata, "Replication of Hologram," Kogaku (Optics), Vol. 17, No 7, pp. 328-332, July 1988.

The prism 300a is made of the same glass as the substrate 100a and its receiving surface 301 is inclined 45 degrees away from the lower surface 102a. If the incident light $L_{10}$ is perpendicular to the receiving surface 301, the incident light $L_{I0}$ goes into the substrate 100a without being refracted at the lower surface 102a.

The incident angle $\theta$ of the light $L_{10}$ is set at 45 degrees so that it satisfies the following condition for total reflection, which is derived from expressions (1a), (1b), (18a), (18b):

$$\theta > \sin^{-1}(n_2/n_1) = 41.8°$$

That is, if the incident light $L_{10}$ is introduced at an angle of 45 degrees, it is totally reflected within the substrate 100a. At the first total reflection position $A_1$, the diffracted beams $L_{U1}$ and $L_{L1}$ are emitted normal to the upper surface 101a and the lower surface 102a, respectively.

Similarly, two diffracted beams $L_{U2}$ and $L_{L2}$ are emitted at the second total-reflection position $A_2$. Since the incident angle $\theta$ is 45 degrees and the thickness $D_1$ of the substrate 100a is 1 mm, the distance $P_1$ between the diffracted beams $L_{U1}$ and $L_{U2}$ is twice the thickness $D_1$, that is, 2 mm. Thus, the beam splitter 1a produces two sets of parallel beams $L_{U1}$, $L_{U2}$, . . and $L_{L1}$, $L_{L2}$, . . . which are normal to the surfaces 101a and 102a, respectively, and which have the same distance $P_1$ (2 mm) between each pair of beams.

Figure 5:
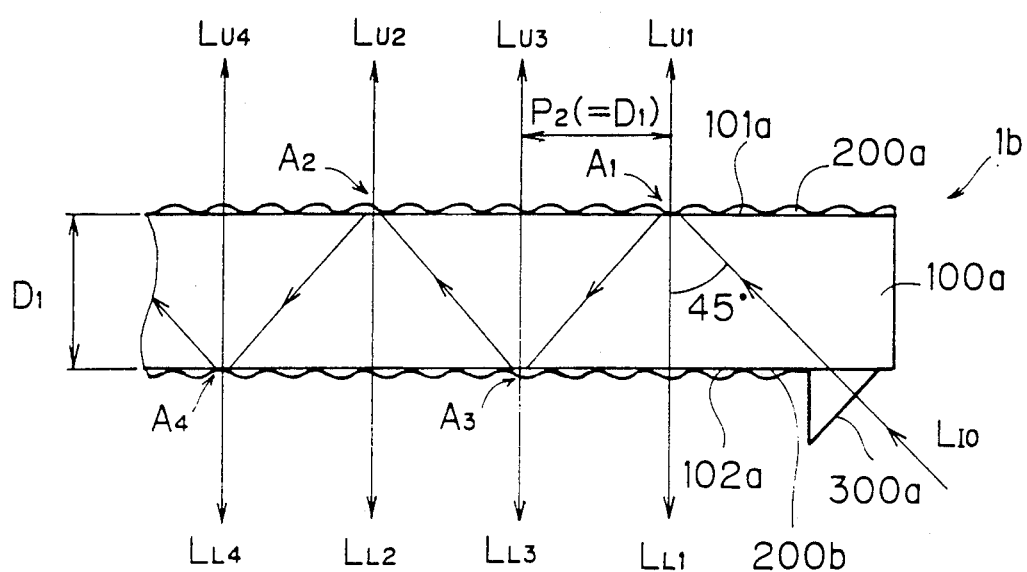

FIG. 5 is a sectional view of a second embodiment of the present invention. The beam splitter 1b comprises a diffraction grating 200b formed on the lower surface 102a of the substrate 100a (in addition to the diffraction grating 200a on the upper surface 101a). When the incident light $L_{I0}$ is introduced into the beam splitter 1b at the incident angle of 45 degrees, diffraction occurs not only at the total-reflection positions $A_1$ and $A_2$ but also at total reflection positions $A_3$ and $A_4$ on the lower surface 102a. Consequently parallel upper diffraction beams $L_{U1}$-$L_{U4}$ are emitted at an interval $P_2$ which is equal to the thickness $D_1$ of the substrate 100a. Lower diffraction beams $L_{L1}$-$L_{L4}$ are emitted in the same manner.

The beam splitter 1b shown in FIG. 5 may be fabricated by preparing two substrates 100a with the diffraction grating 200a on one surface 101a and then pasting them together at the other surface 102a.

Figure 6:
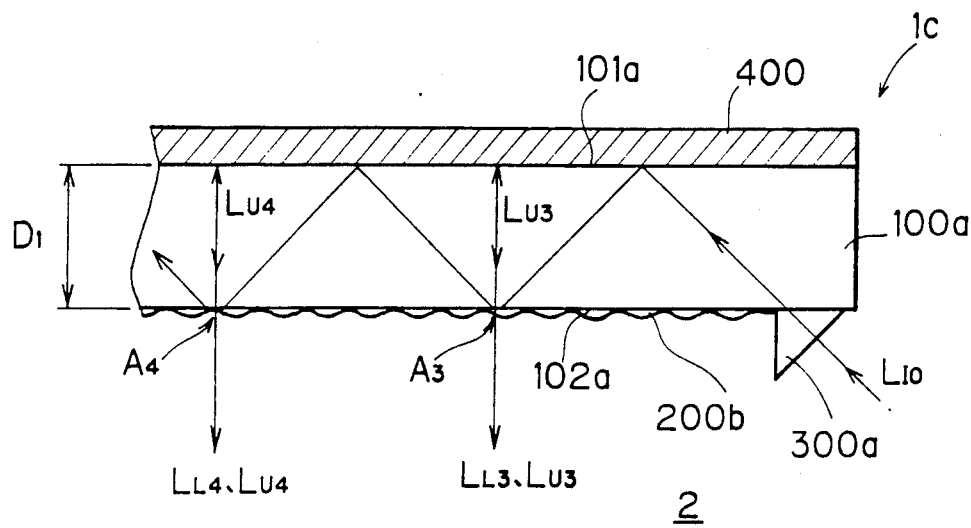

FIG. 6 is a sectional view of a beam splitter 1c which comprises the substrate 100a, the diffraction grating $200b$ formed on the lower surface $102a$, the prism $300a$ fixed on the lower surface $102a$ and a highly reflective metal film $400$ formed on the upper surface $101a$ of the substrate $100a$. In the beam splitter $1c$, the upper diffracted beams $L_{U3}$ and $L_{U4}$ are perpendicularly reflected at the metal film $400$ and thus are transmitted downward together with the lower diffracted beams $L_{L3}$ and $L_{L4}$. Thus, the beam splitter $1c$ can produce light beams which go in one direction (downward in FIG. 6) and whose intensity values are higher than those emitted by the beam splitters $1a$ and $1b$. If twice the thickness $D_1$ of the substrate $100a$, that is, $2D_1$ multiplied by its refraction index n is equal to the wavelength $\zeta_0$ of the incident light $L_{I0}$ multiplied by an integer, the beams emitted by the beam splitter $1c$ are about four times as intense as those emitted by the beam splitters $1a$ and $1b$.

Figure 7:
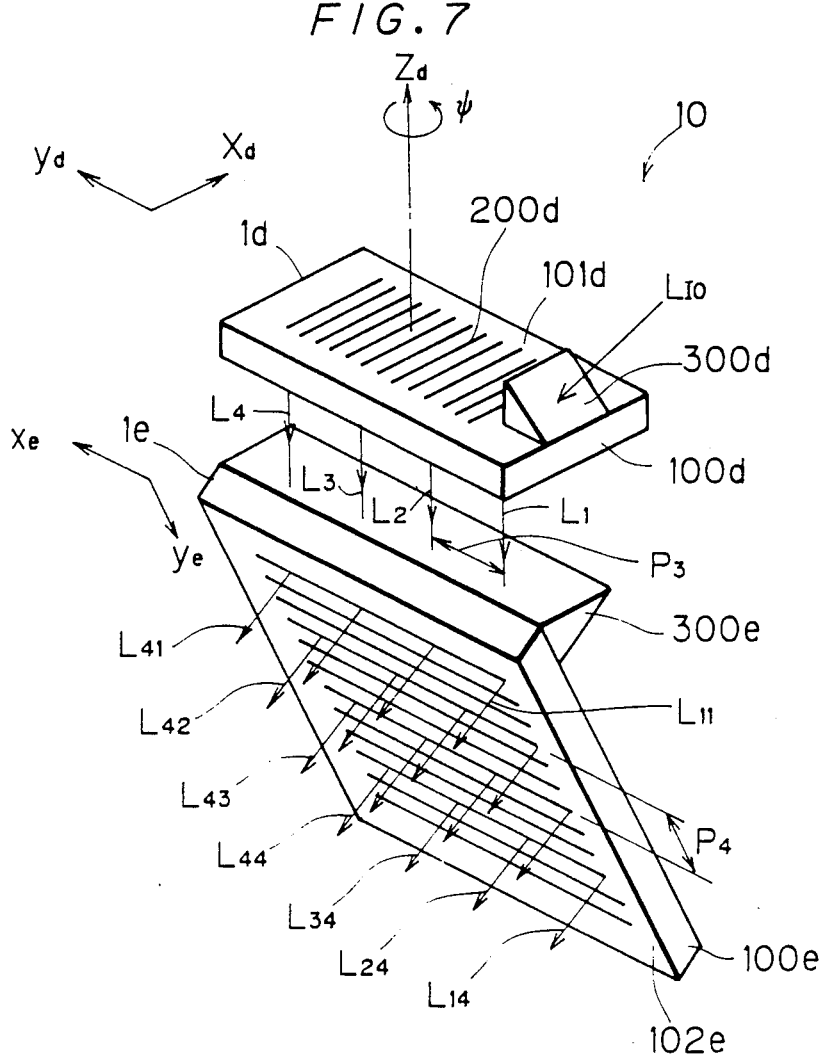
FIG. 7 is a perspective view of a beam splitting system according to the present invention.

A beam splitting system $10$ illustrated in FIG. 7 comprises two beam splitters $1d$ and $1e$. When incident light $L_{I0}$ is incident on a prism $300d$ of the first beam splitter $1d$, diffracted parallel beams $L_1$-$L_4$ are emitted at an interval $P_3$ from the lower surface of a substrate $100d$. A diffraction grating $200d$ of the beam splitter $1d$ is illustrated as parallel lines on the upper surface $101d$ of the substrate $100d$. The outgoing beams $L_1$-$L_4$ are incident on a prism $300e$ of the second beam splitter $1e$. Consequently, the second beam splitter $1e$ produces parallel diffracted beams $L_{11}$-$L_{44}$ which are arranged two-dimensionally.

Figure 8A:
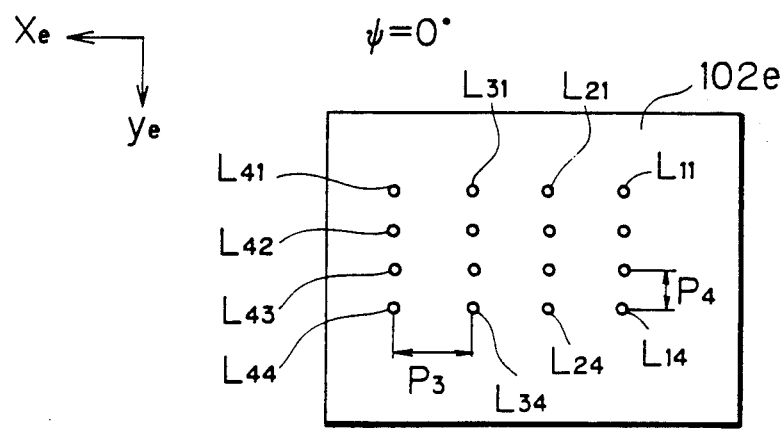
FIGS. 8A and 8B are schematic diagrams showing arrays of multibeams produced with the beam splitting system.

FIG. 8A is a schematic view showing the two-dimensional arrangement of the outgoing beams $L_{11}$-$L_{44}$, viewed from the lower side of the lower surface $102e$ of the substrate $100e$. The four parallel beams $L_1$-$L_4$ form four sets of parallel beams $L_{11}$-$L_{14}$, $L_{21}$-$L_{24}$, $L_{31}$-$L_{34}$ and $L_{41}$-$L_{44}$, respectively, with each set having an interval $P_4$ between each pair of beams. Supposing that $x_e$-$y_e$ coordinates are defined on the lower surface $102e$ of the substrate $100e$, the outgoing beams $L_{11}$-$L_{44}$ are arranged in a manner of lattice points of a rectangular lattice having pitches $P_3$ and $P_4$ in the directions $x_e$ and $y_e$, respectively.

Figure 8B:
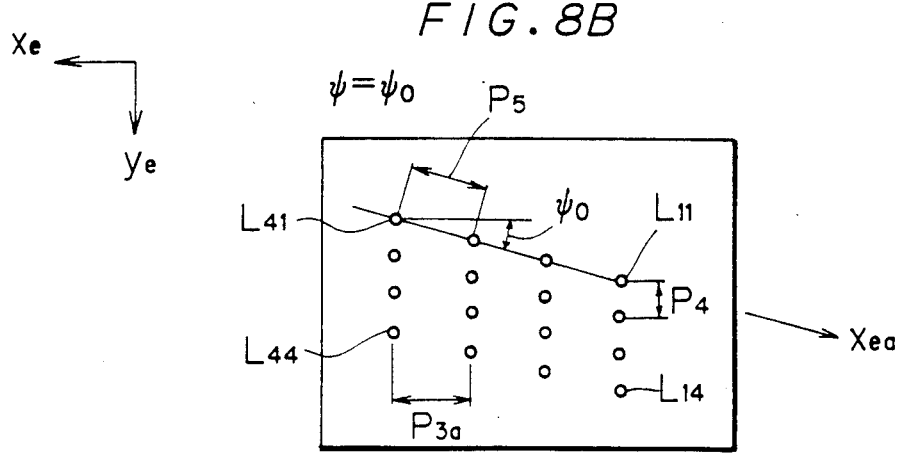

A relative angle $\psi$ of the first beam splitter $1d$ to the second beams splitter $1e$ is equal to zero when the splitters $1d$ and $1e$ are arranged as shown in FIGS. 7 and 8A. The first beam splitter $1d$ and the incident light $L_{I0}$ can be rotated around an axis $z_d$ which is perpendicular to an $x_d$-$y_d$ plane, or the upper surface $101d$ of the substrate $100d$. When the relative angle $\psi$ is equal to $\psi_0$, the arrangement of the outgoing beams $L_{11}$-$L_{44}$ is as shown in FIG. 8B. The four beams $L_{11}$-$L_{44}$ are arranged in FIG. 8B in a direction $x_{ea}$ inclined at the angle $\psi_0$ in a clockwise direction with respect to the direction $x_e$. While the pitch $P_4$ is maintained, a pitch $P_{3a}$ in the direction $x_e$ is as follows:

$$P_{3a} = P_3 \cos \psi_0 \tag{20}$$

Meanwhile, a pitch $P_5$ in the direction $x_{ea}$ in FIG. 8B is equal to the pitch $P_3$ in the direction $x_e$ in FIG. 8A.

The beam splitting system $10$ produces a plurality of parallel, regularly two-dimensionally distributed beams $L_{11}$-$L_{44}$ from a single incident beam $L_{I0}$. Each of the beam splitters $1d$ and $1e$ may be like the beam splitter $1a$ or $1b$ shown in FIG. 3 or 5 or like the beam splitter $1c$ shown in FIG. 6.

Figure 9:
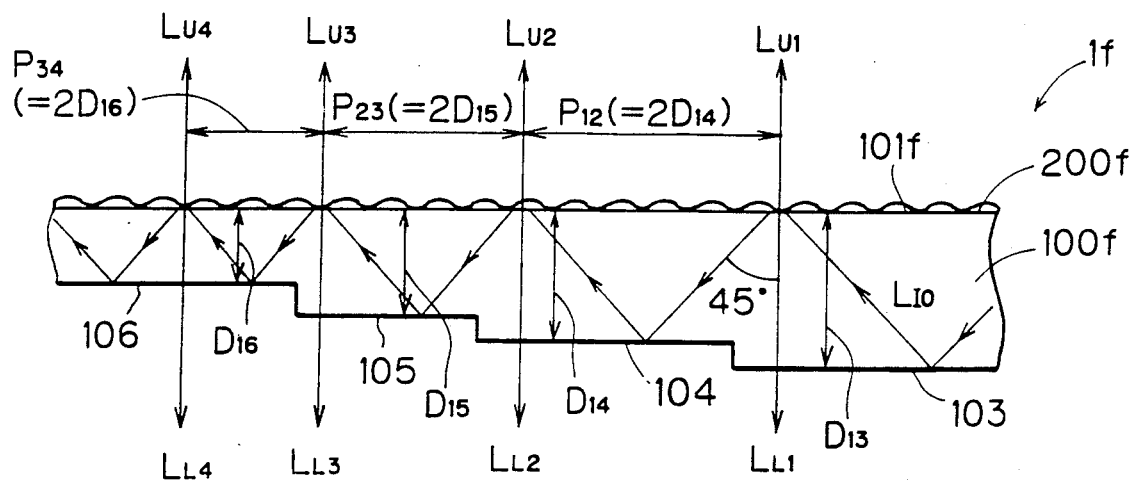

FIG. 9 is a sectional view of another embodiment of the present invention, in which a lower surface of a transparent substrate $100f$ has a stepwise shape, i.e., with step portions $103$-$106$. Thicknesses $D_{13}$-$DL_{16}$ of the substrate $100f$ at the step $103$-$106$, progressively decrease. Each of the step portions $103$-$106$ is parallel to the upper surface $101f$. A diffraction grating $200f$ is formed on the upper surface $101f$.

If incident light $L_{I0}$ is introduced in the beam splitter $1f$ at an incident angle of 45 degrees, upper diffracted beams $L_{U1}$-$L_{U4}$ and lower diffracted beams $L_{L1}$-$L_{L4}$ which are perpendicular to the upper surface $101f$ are emitted. Intervals $P_{12}$, $P_{23}$, $P_{34}$ between the upper diffracted beams $L_{U1}$-$L_{U4}$ are equal to $2D_{14}$, $2D_{15}$ and $2D_{16}$, respectively. The intervals $P_{12}$, $P_{23}$, $P_{34}$ decrease progressively. The intervals of the beams $L_{U1}$-$L_{U4}$ and $L_{L1}$-$L_{L4}$ can be adjusted as desired by changing the thicknesses $D_{13}$-$D_{16}$.

Figure 10:
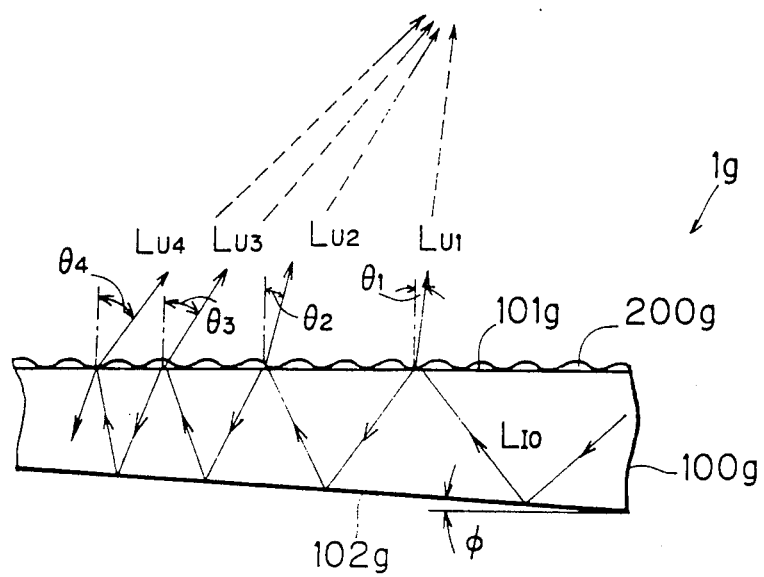
Figure 10A:
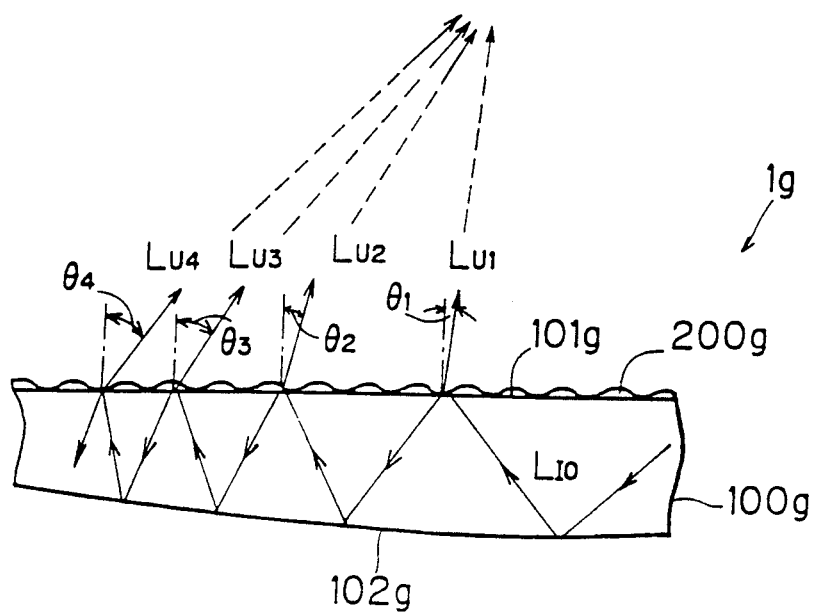

FIG. 10 is a sectional view of another embodiment of the present invention, in which the upper surface $101g$ and a lower surface $102g$ of a transparent substrate $100g$ are inclined at angle $\phi$ with respect to each other. A diffraction grating $200g$ is formed on the upper surface $101g$. Incident light $L_{I0}$ is split in the beam splitter $1g$ into a plurality of outgoing beams $L_{U1}$-$L_{U4}$ which are not parallel to each other. Angles $\theta_1$-$\theta_4$ of the beams $L_{U1}$-$L_{U4}$ with respect to a normal to the upper surface $101g$ progressively increase, and pitches between these beams are different from each other. Lower diffracted beams, which are also emitted, are not illustrated in FIG. 10.

The lower surface $102g$ may be curved, as shown in FIG. 10. If the lower surface of the substrate $100g$ is aspheric, the beams $L_{U1}$-$L_{U4}$ can be converged at a certain distant point.

Figure 11:
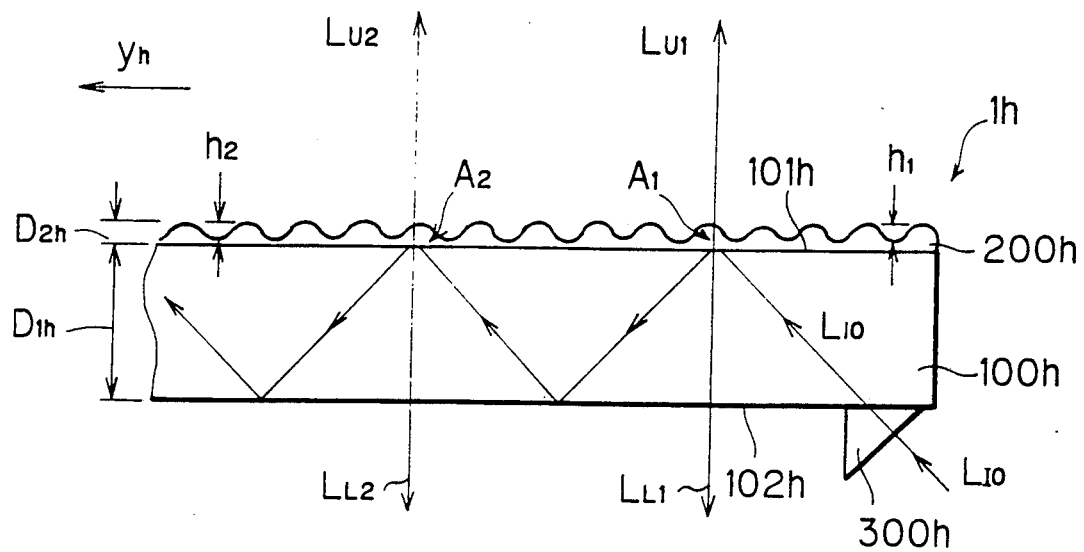

In the foregoing embodiments of the present invention, the intensity of the beams $L_{U1}$, $L_{U2}$, ... decreases geometrically. FIG. 11 illustrates a beam splitter $1h$ which emits equally intense beams $L_{U1}$, $L_{U2}$, .... The beam splitter $1h$ comprises a transparent substrate $100h$, a diffraction grating $200h$ formed on an upper surface $101h$ of the substrate, and a prism $300h$ fixed on the lower surface $102h$ of the substrate. The diffraction grating $300h$ is different from that of the beam splitter $1a$ shown in FIG. 3. The diffraction grating $300h$ has grooves whose depths h1, h2, ... increase in a direction $y_h$, i.e., the direction of the incident light and internal reflected beams. In general, diffraction efficiency increases as the depth of the grooves increases (within a certain range). Diffraction efficiency $\eta_1$ at the first total-reflection position $A_1$ is therefore higher than diffraction efficiency $\eta_2$ at the second total-reflection position $A_2$. Intensity values $I_{U1}$ and $I_{U2}$ of the upper diffraction beams $L_{U1}$ and $L_{U2}$ are as follows:

$$I_{U1} = I_{I0} \cdot \eta_{U1} \tag{21}$$

$$I_{U2} = I_{I0}(1-\eta_1) \cdot \eta_{U2} \tag{22}$$

where the total diffraction efficiency $\eta_1$ is defined by equations (8a) through (8c).

To make the intensity values $I_{U1}$ and $I_{U2}$ equal to each other, the right hand sides of the equations (21) and (22) are made equal to each other. To make the intensity values of the upper diffracted beams $L_{U1}$ and $L_{U2}$, ... $L_{Ui}$ equal to each other, the diffraction efficiency values $\eta_{U1}$, $\eta_{U2}$, ..., $\eta_{Ui}$ satisfy the following relationship:

$$\eta_{Uj} = \eta_{Uj-1}/(1-\eta_{j-1}) \tag{23}$$

where j is an integer ranging from 2 to i.

According to equation (23), if the diffraction efficiency values $\eta_{U1}$ and $\eta_{L1}$ are 0.10 and 0.09, respectively, then the total diffraction efficiency $\eta_1$ is 0.19 and the diffraction efficiency $\eta_{U2}$ is about 0.123. These values can be attained by adjusting the depths of the grooves of the diffraction grating 300h.

Figure 12:
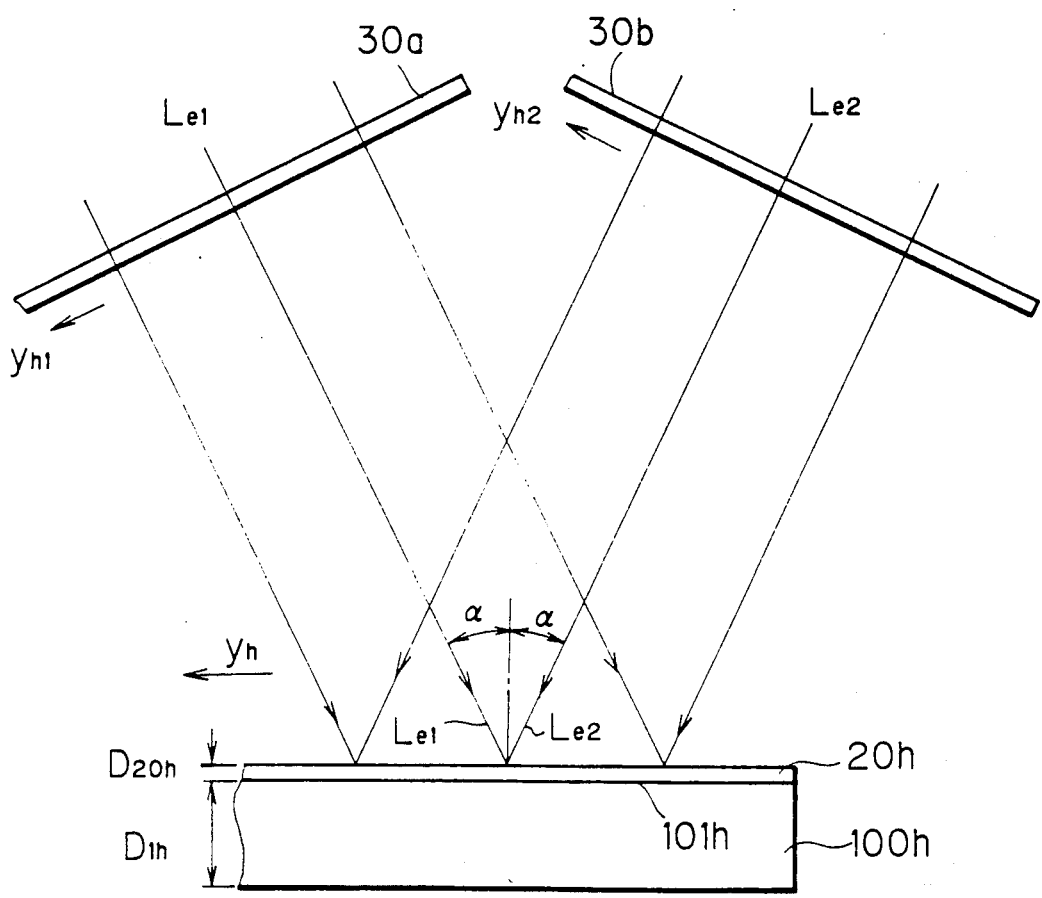

FIG. 12 schematically illustrates a method of fabricating the diffraction grating 300h. First, a uniformly thick photoresist 20h is coated on the upper surface 101h of the substrate 100h. Second, in the same manner as illustrated in FIG. 4, two homogeneous light beams L$_{e1}$ and L$_{e2}$ are projected onto the photoresist 20h at the same incident angle but from opposite sides. But in FIG. 12, two ND (Neutral Density) filters 30a and 30b are inserted between the light sources and the photoresist 20h. The transmissivity of the ND filters 30a and 30b increases in directions y$_{h1}$ and y$_{h2}$, respectively, and therefore the exposure of the photoresist 20h increases in the direction y$_h$. As a result, the diffraction grating 300h having grooves whose depth increases continuously is formed on the substrate 100h. Incidentally, the thickness D$_{2h}$ of the diffraction grating 200h and the thickness D$_{20h}$ of the photoresist 20h are exaggerated in FIGS. 11 and 12. These thicknesses are actually very much smaller than the thickness D$_{1h}$ of the substrate 100h.

Figure 13:
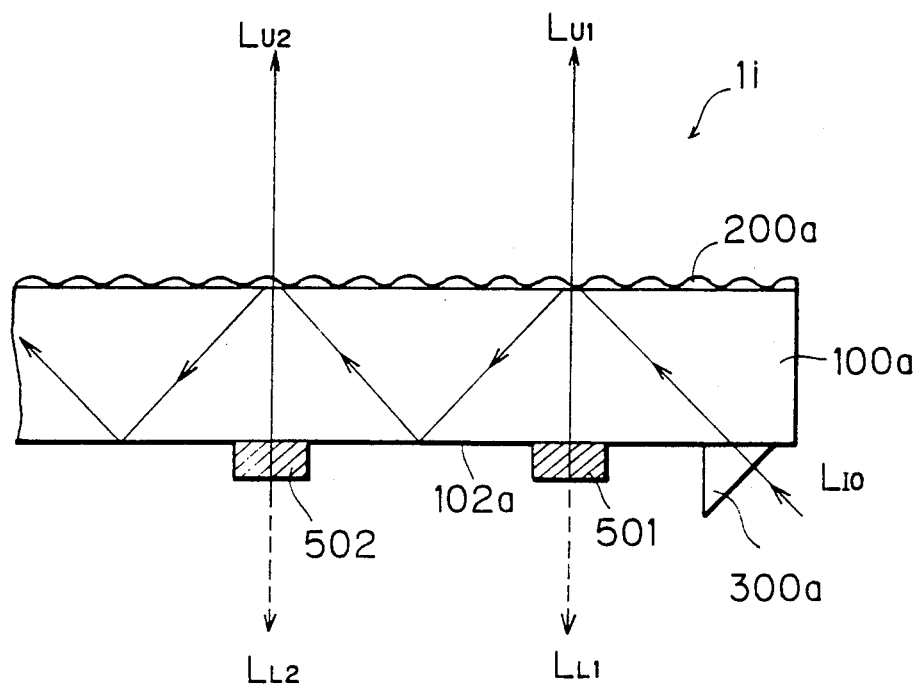

A beam splitter according to the present invention may be provided with elements having various functions. FIG. 13 is a sectional view of a beam splitter 1i provided with liquid crystal elements. The beam splitter 1i is fabricated from the beam splitter 1a shown in FIG. 2 by attaching liquid crystal elements 501 and 502 on the lower surface 102a of the substrate 100a. The liquid crystal elements 501 and 502 are placed where the lower diffracted beams L$_{L1}$ and L$_{L2}$ are to pass through, respectively. The lower diffracted beams L$_{L1}$ and L$_{L2}$ are ON/OFF controlled by changing the voltage supplied to the liquid crystal elements 501 and 502.

The liquid crystal elements 501 and 502 may be of a twist-nematic type provided with a polarizing plate. A polarization plane of the twist-nematic polarizing plate can be rotated by adjusting the voltage level given thereto, and the lower diffracted beams can be modulated accordingly.

Instead of the liquid crystal elements, lithium niobate (LiNbO$_3$) may be attached to the lower surface 100a, with a highly reflective metal film being formed on a lower surface of the lithium niobate. The refractive index of lithium niobate depends on the voltage supplied thereto. An optical path length of the lower diffracted beam, which is reflected by the metal film and emitted upward with the upper diffracted beam, is therefore changeable by adjusting the voltage level. Thus, the magnitude of interference between the upper diffracted beam and the lower diffracted beam is changed by controlling the voltage level, and the outgoing beam emitted upward from the beam splitter 1i is modulated accordingly. Other function elements (besides the liquid crystal and lithium niobate) are also applicable to a beam splitter according to the present invention.

Figure 14:
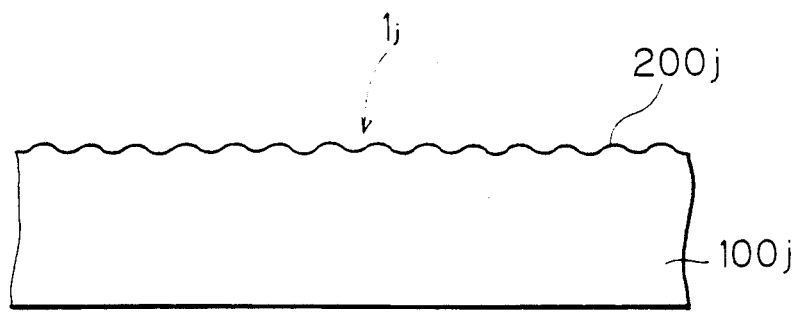

The diffraction grating can be formed by directly processing a surface of a transparent substrate through holography, instead of exposing photoresist coated on the substrate. FIG. 14 is a sectional view of a beam splitter 1j thus fabricated. A substrate 100j is integral with a diffraction grating 200j. There is no boundary between them. However, this beam splitter 1j operates the same as the other embodiments.

The following methods may be used to form the diffraction grating 200j.

A first method is according to photolithography, comprising the steps of coating photoresist on a surface of the substrate 100j, exposing the photoresist to make interference fringes in the photoresist, developing the photoresist, and etching the surface of the substrate 100j while using the photoresist as a mask.

A second method comprises the steps of coating photoresist on a suitable slab (other than the substrate 100j), exposing and developing the photoresist to make a wavelike shape, vapor-depositing gold or the like on the photoresist, plating metal (such as nickel) on the photoresist, and embossing the substrate 100j while using the slab with nickel plating as a metallic mold. In this case, the substrate 100j is thermoplastic as well as transparent.

According to a third method, instead of making the diffraction grating of a wavelike shape, a surface of a substrate is processed so that the refractive index of the processed surface changes in a striped pattern. The refractive index can be changed by forming the substrate 100j of multicomponent glass, and exchanging some components such as Na and/or K, which are included as modified oxides, with other ions supplied from outside.

The substrate can be made of any transparent material, and it is not necessarily a structural element. In other words, the substrate can be any layer within which incident light can be repeatedly totally reflected.

Figure 15:
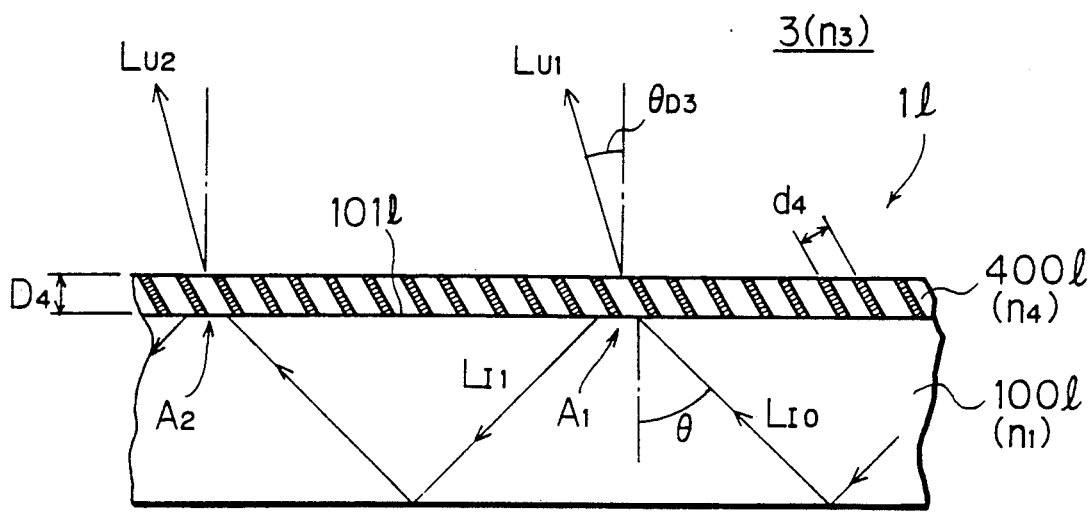

A diffraction grating of a three dimensional hologram may be used in place of that of the two dimensional hologram used in the above embodiments. FIG. 15 is a sectional view showing a beam splitter 1l having a diffraction grating of a three dimensional hologram. The beam splitter 1l comprises a transparent substrate 100l and a diffraction grating layer 400l formed on an upper surface 101l of the transparent substrate 100l. FIG. 15 schematically shows refractive index distribution in the diffraction grating layer 400l. Shaded portions in the figure have a comparatively high refractive index and blank portions have a comparatively low refractive index. The diffraction grating layer 400l is fabricated by coating photosensitive material, such as photopolymer, bichromate gelatin, or emulsion, on the transparent substrate 100l, and exposing the photosensitive material with laser beams to form interference fringes.

The beam splitter 1l is a transmission type. The incident light L$_{I0}$ introduced into the transparent substrate 100l is diffracted by the interference fringes in the diffraction grating layer 400l, and thereby an upper diffracted beam L$_{U1}$ is emitted upwardly. Meanwhile, the rest of the incident beam L$_{I0}$ is totally reflected by a surface of the diffraction grating layer 400l, and propagates in the transparent layer 100l. The following equation is a discriminant for the types of holograms (a two dimensional hologram or a three dimensional hologram).

$$Q = 2\pi\lambda D_4/(n_4 d_4^2) \quad (24)$$

where $n_4$ is the refractive index of the material of the diffraction grating layer 400l, $D_4$ is the thickness of the diffraction grating layer 400l, $d_4$ is the interval between the interference fringes in the diffraction grating layer 400l, and $\lambda$ is the wavelength of the light in air (=0.6328 μm). It is known that the parameter Q is generally no less than ten for the three dimensional hologram. If the parameter Q in equation (24) is no less than ten, the beam splitter 1*l* emits a diffracted beam ($L_{U1}$) only upwardly (or from the transparent substrate 100*l* to the side of the diffraction grating layer 400*l*).

Figure 16:
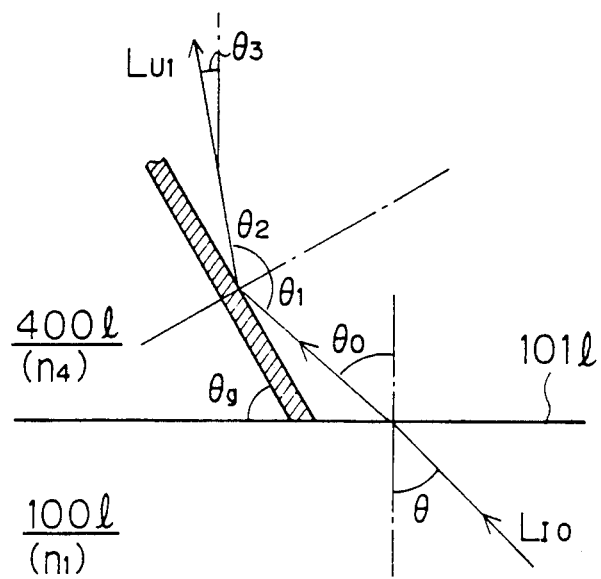
FIGS. 16 and 18 are diagrams showing light paths in the vicinity of a surface of a transparent substrate.

FIG. 16 schematically illustrates a light path in the vicinity of the surface 101*l*. The following equations are satisfied according to Snell's law with respect to FIGS. 15 and 16:

$$n_1 \sin \theta = n_4 \sin \theta_0 \quad (25)$$

$$n_3 \sin \theta_{D3} = n_4 \sin \theta_3 \quad (26)$$

where $\theta_0$ is a refraction angle at the surface 101*l*, $\theta_1$ is an incident angle of the incident beam with respect to a normal to the interference fringes, $\theta_2$ is a diffraction angle of a diffracted beam with respect to the interference fringes, and $\theta_3$ is an angle between the diffracted beam in the diffraction grating layer and a mound to the surface 101*l*.

Moreover, the following equations are satisfied:

$$\theta_1 = \theta_2 \quad (27)$$

$$\theta_0 = 180° - (\theta_1 + \theta_g) \quad (28)$$

$$\theta_3 = \theta_1 - \theta_g \quad (29)$$

where $\theta_g$ is an angle between the surface 101*l* and interference fringes.

It is assumed that $n_1 = 1.5$, $n_2 = n_3 = 1.0$, and $n_4 = 1.6$ in the following calculations.

When the upper diffracted beam $L_{U1}$ is perpendicular to the upper surface 101*l* of the transparent substrate 101*l*, $\theta_{D3}$ is equal to zero in equation (26). Accordingly, the following equation is obtained from equations (26) and (29):

$$\sin(\theta_1 - \theta_g) = 0 \quad (30)$$

Therefore:

$$\theta_1 = \theta_g \quad (31)$$

When $\theta = 45°$, the following values are obtained from equations (25) and (28).

$$\theta_0 = 41.51° \quad (32)$$

$$\theta_1 + \theta_g = 138.48° \quad (33)$$

Since $\theta_1 = \theta_g$, $$\theta_g = \theta_1 = \theta_2 = 69.24° \quad (34)$$

Meanwhile, when the following equation is satisfied, diffraction occurs in the diffraction grating layer 400*l* under the Bragg condition:

$$d_4 = \lambda/(2 n_4 \cos \theta_1) \quad (35)$$

By substituting $\lambda = 0.6328$ μm, $n_4 = 1.6$, and $\theta_1 = 69.24°$ into equation (35), the interval $d_4$ is found to be 0.558 μm.

In short, when $\theta_g = 69.24°$, $d_4 = 0.558$ μm and $\theta = 45°$, the upper diffracted beam $L_{U1}$ is perpendicular to the surface of the transparent substrate.

Incidentally, the thickness $D_4$ of the diffraction grating layer 400*l* is determined according to the discriminant (24) where the value of the parameter Q is no less than ten for the three dimensional hologram. The thickness $D_4$ is found to be 1.253 μm by substituting $Q = 10$ into equation (24). Thus, the thickness $D_4$ of the diffraction grating layer 400*l* is no less than 1.253 μm. However, the smaller the thickness $D_4$, the better, on account of loss due to absorption of light in the diffraction grating layer 400*l*.

To equalize the intensities of the upper diffracted beams $L_{U1}$ and $L_{U2}$ produced at the total reflection positions $A_1$ and $A_2$, the diffraction efficiency at the second total reflection position $A_2$ is made higher than that at the total reflection position $A_1$. The diffraction efficiency of the three dimensional hologram depends on the difference between refractive indexes at the interference fringes. Therefore, if exposure with laser beams is controlled so that parts of the diffraction grating layer 400*l* positioned at the total reflection positions $A_1$ and $A_2$ have different refractive indexes, the intensities of the upper diffracted beam $L_{U1}$ and $L_{U2}$ can be equalized.

In general, the diffraction efficiency of the three dimensional hologram can be higher than that of the two dimensional hologram (theoretically, it can be up to 100%). Therefore, the incident beam $L_{I0}$ is utilized more efficiently with the three dimensional hologram.

Figure 17:
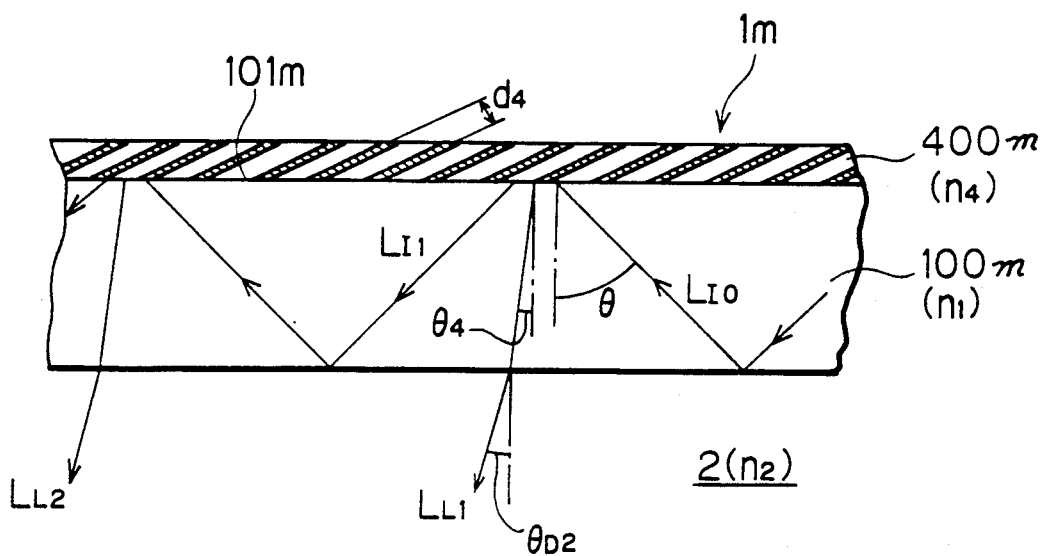
Figure 18:
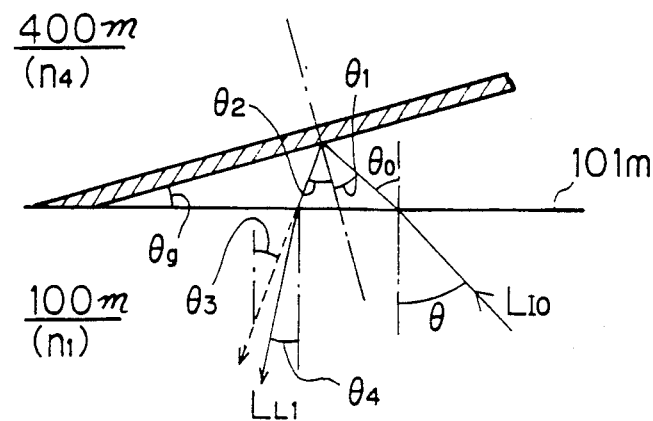
Figure 19:
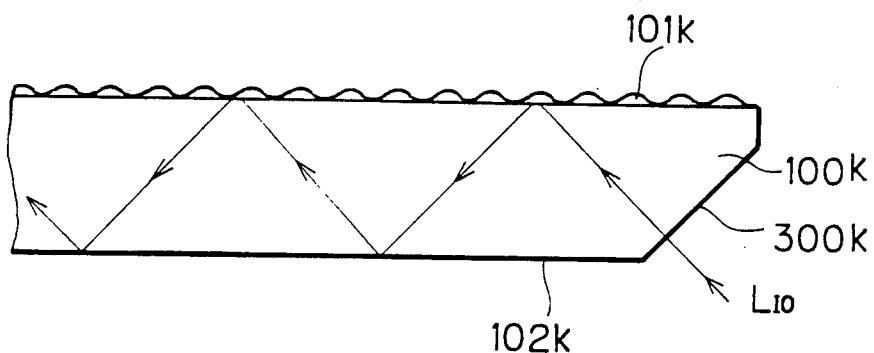
Figure 21:
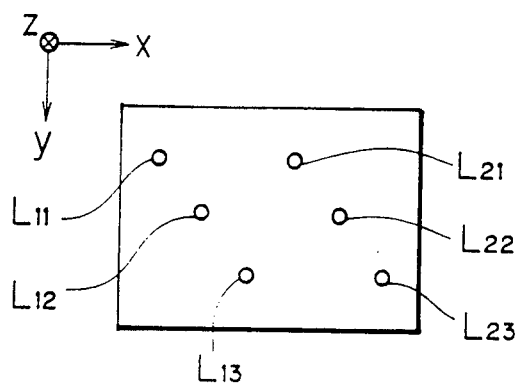
FIG. 21 is a diagram showing an array of the multibeams utilized in the optical system.

FIG. 17 is a sectional view of a reflection type beam splitter 1*m* having a diffraction grating of a three dimensional hologram. The beam splitter 1*m* comprises a transparent substrate 100*m* and a diffraction grating layer 400*m* formed on the upper surface 101*m* of the substrate 100*m*. FIG. 18 schematically illustrates a light path in the vicinity of the surface 101*m*, in the same manner as FIG. 16. The following equations hold with respect to FIGS. 17 and 18:

$$n_1 \sin \theta = n_4 \sin \theta_0 \quad (36)$$

$$n_1 \sin \theta_4 = n_4 \sin \theta_3 \quad (37)$$

$$n_2 \sin \theta_{D2} = n_1 \sin \theta_4 \quad (38)$$

$$\theta_1 = \theta_2 \quad (39)$$

$$\theta_0 = \theta_1 + \theta_g \quad (40)$$

$$\theta_3 = \theta_1 - \theta_g \quad (41)$$

where $\theta_4$ is an angle between the lower diffracted beam in the transparent substrate 100*m* and a normal to the surface 101*m*, the other variables being defined in the same manner as in equations (25) to (29).

When the lower diffracted beam $L_{L1}$ is perpendicular to the transparent substrate 100*m*, $\theta_{D2}$ is equal to zero. From equations (37) and (38), we obtain:

$$\sin \theta_3 = 0 \quad (42)$$

Therefore, from equation (41), $\theta_1 = \theta_g$. When $\theta = 45°$, we obtain from equation (36):

$$\theta_0 = 41.52° \quad (43)$$

From equation (40):

$$\theta_g = \theta_1 \theta_2 = 20.76° \quad (44)$$

The interval $d_4$ of the interference fringes is as follows, on account of the Bragg condition:

$$d_4 = \lambda/(2n_4 \cos\theta_1) \tag{45}$$

In short, if $\theta_g = 20.76°$, $d_4 = 0.211$ μm and $\theta = 45°$, then the lower diffracted beam $L_{L1}$ is perpendicular to the substrate.

Another element (other than the prism) for introducing incident light can be used. For example, a prism can be fixed over a substrate with a small gap therebetween; consequently, incident light can be introduced according to a prism coupling method. A prism coupling method is described in Hiroshi Nishihara et al., "Hikari-Shuseki-Kairo (Integrated Optical Circuits),"(Ohmusha Company, 1985), page 237. Alternatively, a grating such as a three-dimensional hologram, through which incident light can be introduced, may be formed on a surface of a substrate. Such a three-dimensional hologram is described in Takanori Okoshi, "Hoarogurafi (Holography)," (koronasha, 1977), page 20.

The element for introducing incident light can be integral with a substrate. FIG. 15 illustrates a beam splitter whose end portion is cut diagonally with respect to its surfaces 101k and 102k to form a receiving surface 300k for incident light $L_{I0}$.

Moreover, the diffraction grating can be formed by electron beam scanning, laser beam scanning, or ion beam etching. The present invention is not limited to the interference method described above.

The beam splitters 1, 1a, 1b, 1c, 1h, 1l and 1m shown in FIGS. 2, 3, 5, 6, 11, 15 and 17, respectively, can be utilized as described in U.S. Pat. No. 4,125,864, for example.

The beam splitting system 10 shown in FIGS. 7, 8A and 8B can be installed in a multibeam scanner. FIG. 20A is a plan view and FIG. 20B is a front view of an optical system for focusing an array of multibeams $L_{11}$–$L_{13}$ and $L_{21}$–$L_{23}$. The optical system comprises a cylindrical lens 601, an intermediate image surface 602, a relay lens 603, and an exposure surface 604. The intermediate image surface 602 is positioned at a focal surface of the cylindrical lens 601. FIGS. 20A and 20B show focal surfaces $FP_1$ and $FP_2$ of the relay lens 603. The distance between the intermediate image surface 602 and the relay lens 603 is equal to the sum of the focal length f of the relay lens 603 and the focal length f divided by a magnification $\beta$.

The distance between the relay lens 603 and the exposure surface 604 is equal to the sum of the focal length f and the focal length f multiplied by the magnification $\beta$. The parallel multibeams pass through the cylindrical lens 601 to be converged in a direction x on the intermediate image surface 602. Beam spots of the multibeams have the shape of a line on the intermediate image surface 602. The multibeams are converged by the relay lens 603 in a direction y on the focal surface $FP_2$ and converged in the direction x on the exposure surface 604. Thus, the exposure surface 604 is exposed with plural beam spots which are aligned in the y direction.

Figure 22:
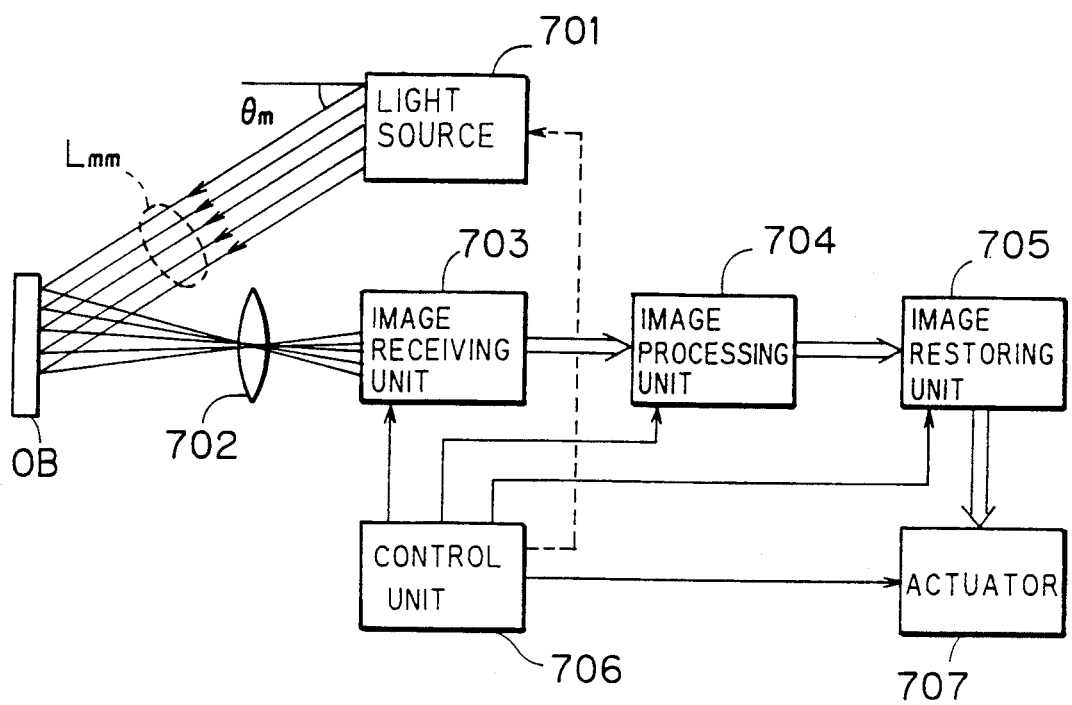
FIG. 22 is a schematic block diagram of a shape identifying apparatus provided with the beam splitting system.

The beam splitting system 10 can also be utilized as a light source in an apparatus for identifying a shape of an object. FIG. 22 is a schematic block diagram of the shape identifying apparatus. The shape identifying apparatus comprises a light source 701, an image forming lens 702, an image receiving unit 703, an image processing unit 704, an image restoring unit 705, a control unit 706, and an actuator 707. The light source includes the beam splitting system 10 and emits multibeams $L_{mm}$ at an angle $\theta_m$ with respect to a certain reference axis. The multibeams $L_{mm}$ are incident on an object OB, and are diffusely reflected on its surface. The reflected beams pass through the image forming lens 702 to be received by the image receiving unit 703. The image receiving unit 703 includes a two-dimensional image sensor (such as a two-dimensional CCD) for producing image information on the basis of intensity and arrangement of the multibeams. Since the positional relationship between the light source 701 and the two-dimensional image sensor is fixed, each position of the multibeams on a receiving surface of the two-dimensional image sensor depends on the three-dimensional shape of the surface of the object OB. The shape identifying apparatus identifies the shape of the surface of the object OB on the basis of the angle $\theta_m$, emitting-positions of the multibeams in the light source 701, and the receiving positions of the multibeams in the two-dimensional image sensor.

The image processing unit 704 eliminates noise components in the image information produced in the image receiving unit 703 to obtain receiving-position information concerning the multibeams. The image processing unit 704 further performs pairing of emitting-position information obtained at the light source and the receiving-position information. For example, the light source 701 emits each beam at a different timing from each other, and a receiving-position of each beam received at a particular time is paired to an emitting-position of a beam emitted at the same timing.

Figure 23A:
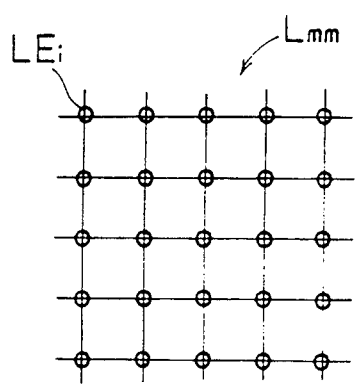
FIGS. 23A and 23B are diagrams showing arrays of emitting beams and received beams, respectively, in the shape identifying apparatus.
Figure 23B:
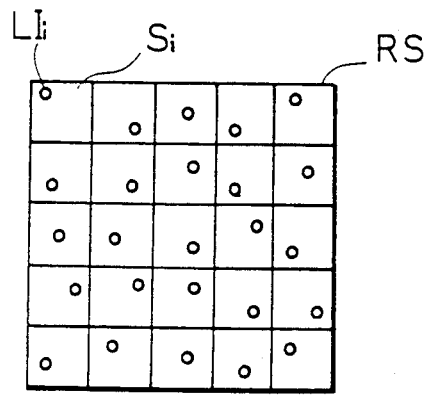

If the surface of the object OB is flat and the array of emitting beams remains similar to that of received beams, the pairing is performed as follows. FIG. 23A illustrates an array of the multibeams emitted from the light source 701, and FIG. 23B illustrates a receiving surface RS of the two-dimensional image sensor. The receiving surface RS is divided into segment areas $S_i$, each of which receives one of the multibeams. Since an emitted beam $LE_i$ is always received at a corresponding segment $S_i$, a beam $LI_i$ received at a segment $S_i$ is paired to the emitted beam $LE_i$.

The image restoring unit 705 produces information on the three-dimensional shape of the object OB on the basis of the positional information and pairing information.

The actuator 707 may, for example, display the shape of the object OB, or judge whether the object OB is a defective piece.

The diffraction grating of the beam splitter 1a shown in FIG. 3, for example, has a constant diffraction efficiency, whereby the intensities of the respective beams $L_{L1}$ and $L_{L2}$ ($L_{U1}$ and $L_{U2}$) decrease step by step in the order of diffracting. The beam splitter 1f shown in FIG. 9 can produce a plurality of beams $L_{L1}$–$L_{L4}$ ($L_{U1}$–$L_{U4}$) whose intensity distribution on an object to be illuminated is constant by providing the step portions 103–106 as described before, in which the intervals of the beams $L_{L1}$–$L_{L4}$ ($L_{U1}$–$L_{U4}$) are adjusted according to their intensity decrease ratio When the beam splitter 1f is installed in a lighting system, the lighting system can attain uniform illuminance distribution. Similarly, a heating system provided with the beam splitter 1f can attain uniform temperature distribution.

Moreover, the pitches of outgoing beams from the beam splitter 1f can be adjusted by changing the thickness of the substrate 100f, as described before. The beam splitter 1f may therefore be utilized within an apparatus for drawing or processing a fixed pattern, such as a bar code.

According to the present invention, an incident light beam is reflected within a transparent layer, and the internal reflected beam is diffracted at the surface of the transparent layer, on which a diffraction grating is formed. As a result, a plurality of diffracted beams can be produced from a single incident beam. Since a diffracted grating is easier to form than multilayers, the beam splitter according to the present invention is easier to fabricate than one formed with multilayers.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A beam splitter, comprising:

a transparent layer, an introduction member for introducing a light beam into said transparent layer such that said light beam is totally reflected in said transparent layer, and a diffraction grating formed on at least a part of a first surface of said transparent layer, at which part said light beam is totally reflected, said diffraction rating diffracting said light beam to produce a plurality of diffracted beams going out of said transparent layer, said first surface of said transparent layer being flat, said transparent layer further comprising a second, step shaped surface each step of which is parallel to said flat surface.

2. A beam splitter, comprising:

a transparent layer, an introduction member for introducing a light beam into said transparent layer such that said light beam is totally reflected in said transparent layer, and a diffraction grating formed on at least a part of a first surface of said transparent layer, at which part said light beam is totally reflected, said diffraction grating diffracting said light beam to produce a plurality of diffracted beams going out of said transparent layer, said first surface of said transparent layer being flat, said transparent layer including a second flat surface which is inclined with respect to said first flat surface.

3. A beam splitter, comprising:

a transparent layer, an introduction member for introducing a light beam into said transparent layer such that said light beam is totally reflected in said transparent layer, and a diffraction grating formed on at least a part of a first surface of said transparent layer, at which part said light beam is totally reflected, said diffraction rating diffracting said light beam to produce a plurality of diffracted beams going out of said transparent layer, said first surface of said transparent layer being flat, said transparent layer including a curved surface which is opposite to said first flat surface, the curvature of said curved surface being such that said diffracted beams converge to a point.

* * * * *